(12) United States Patent
Yoshitani et al.

(10) Patent No.: US 7,008,118 B2
(45) Date of Patent: Mar. 7, 2006

(54) FERULE FOR OPTICAL CONNECTOR (75) Inventors: Kiyoshi Yoshitani, Tokyo (JP); Kazuhiko Uneme, deceased, late of Tokyo (JP); by Hinako Uneme, legal representative, Tokyo (JP); by Haruhiko Uneme, legal representative, Tokyo (JP); by Hideaki Uneme, legal representative, Gunma (JP); by Naoko Uneme, legal representative, Tokyo (JP)

(73) Assignee: Ohashi Technica, Inc., Tokyo (JP)

( * ) Notice: Subject to any disclaimer, the term of this patent is extended or adjusted under 35 U.S.C. 154(b) by 0 days.

(21) Appl. No.: 10/481,186

(22) PCT Filed: May 1, 2002

(86) PCT No.: PCT/JP02/04375

§ 371 (c)(1),
(2), (4) Date: Jun. 28, 2004

(87) PCT Pub. No.: WO03/001263

PCT Pub. Date: Jan. 3, 2003

(65) Prior Publication Data
US 2004/0234208 A1 Nov. 25, 2004

(30) Foreign Application Priority Data
Jun. 21, 2001 (JP) ............................ 2001-188364

(51) Int. Cl.
*G02B 6/36* (2006.01)
(52) U.S. Cl. .............................. 385/78; 385/60; 385/72
(58) Field of Classification Search .................... None
See application file for complete search history.

(56) References Cited

U.S. PATENT DOCUMENTS 4,729,624 A * 3/1988 Kakii et al. ................... 385/78

FOREIGN PATENT DOCUMENTS

| JP | 9-21928 | 1/1997 |
| JP | 2001-96570 | 4/2001 |

* cited by examiner

*Primary Examiner*—Frank G. Font
*Assistant Examiner*—Michael P. Mooney
(74) *Attorney, Agent, or Firm*—Westerman, Hattori, Daniels & Adrian, LLP (57) ABSTRACT This invention relates to a ferule of an optical connector for connecting optical fibers with each other, and an object of the invention is to provide a ferule of an optical connector that can fix and mold a pipe favorably as well as can be manufactured easily. As a solving means, there is provided a ferule for an optical connector for fixing and holding the ends of the optical fibers and optically coupling the optical fibers with each other by inserting ferules from both the ends of a sleeve, the ferule being arranged such that a metal or non-metal pipe 4 having cut portions 8, which are filled with a resin, or protruding portions 9, which protrude into the pipe and the peripheries of which are filled with the resin, is used, the cut portions 8 or the protruding portions 9 being formed at any one of the rear and front ends of the pipe at one position or a plurality of positions, and the base section 2 of the ferule is covered with the pipe by insert molding the pipe as well as the rear end of the pipe 4 is buried in a collar portion 5 formed to the base section.

8 Claims, 6 Drawing Sheets

FERULE FOR OPTICAL CONNECTOR

TECHNICAL FIELD

The present invention relates to a ferule for an optical connector.

BACKGROUND ART

Figure 6:
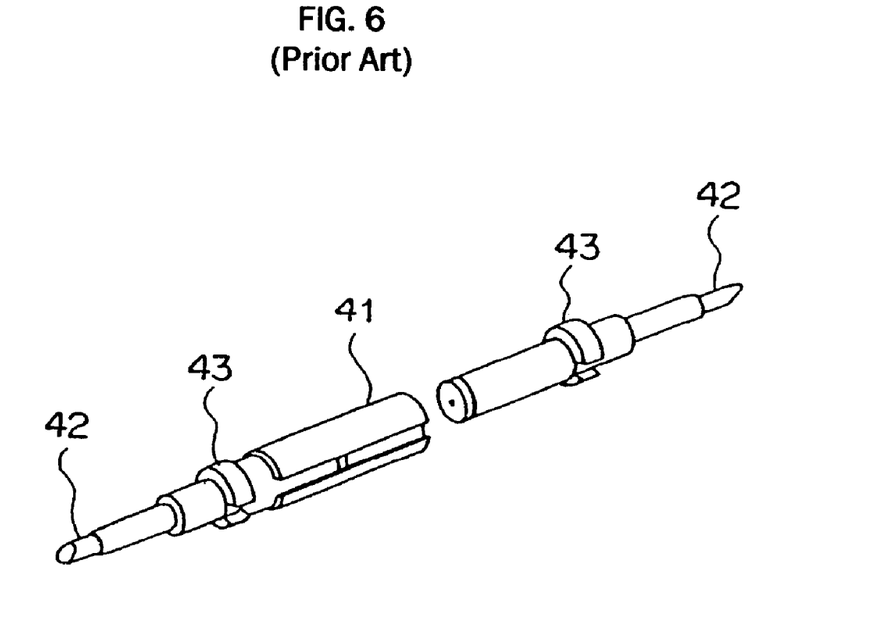
FIG. 6 is a view showing ferules connected to each other.

Heretofore, in an optical communication executed using an optical fiber, a ferule 43 for an optical connector is used to connect optical fibers 42 to each other as shown in FIG. 6. The ferule 43 optically connects the optical fibers 42 to each other by fixing and holding the optical fibers 42 therein and inserting them from both the sides of a sleeve 41. Further, the ferule 43 employs such a structure that the portion thereof engaged with the sleeve 41 is covered with a pipe of metal and the like for the purpose of accuracy and reinforcement.

Note that the ferule for the optical fiber that are practically used at present is mainly of a SC type (Single fiber coupling optical Connector) and the like in which the portion of the ferule engaged with a sleeve is have an outside diameter of 2.5 mm and of a MU type (Miniature-Unit coupling optical fiber connector) and the like having an outside diameter of 1.25 mm, the SC type ferule having the outside diameter of 2.5 mm becomes a standard model in the world, and, in recent years, a demand for the ferule having the outside diameter of 1.25 mm is increased.

Figure 7:
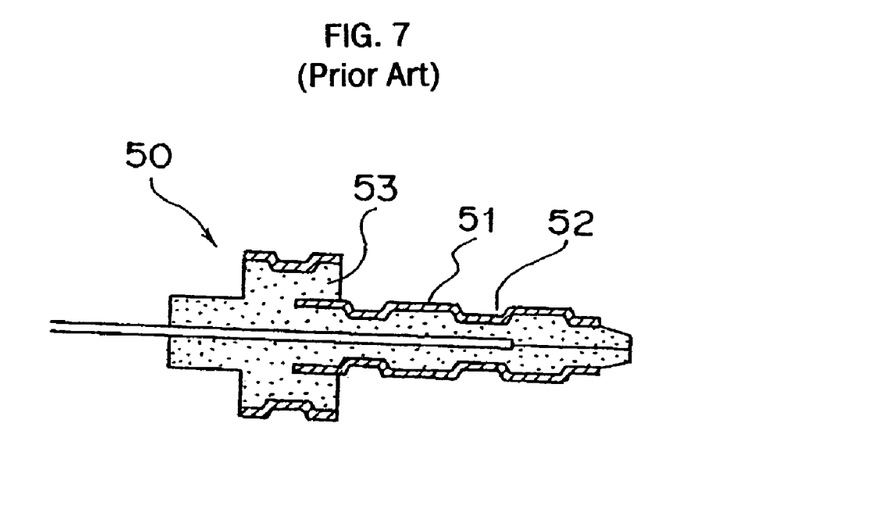
FIG. 7 is a view showing a ferule according to a known example.

A ferule 50 shown in FIG. 7 is disclosed as the structure of the ferule covered with the pipe of metal and the like (Japanese Examined Patent Publication No. 5-23402). The ferule 50 includes a molded resin covered with a metal pipe 51 to which a concavo-convex portion 52 having a different diameter is formed. The adhesive force of the ferule 50 with a molded resin is increased by the concavo-convex portion 52, thereby the extraction of the metal pipe can be prevented.

Figure 8:
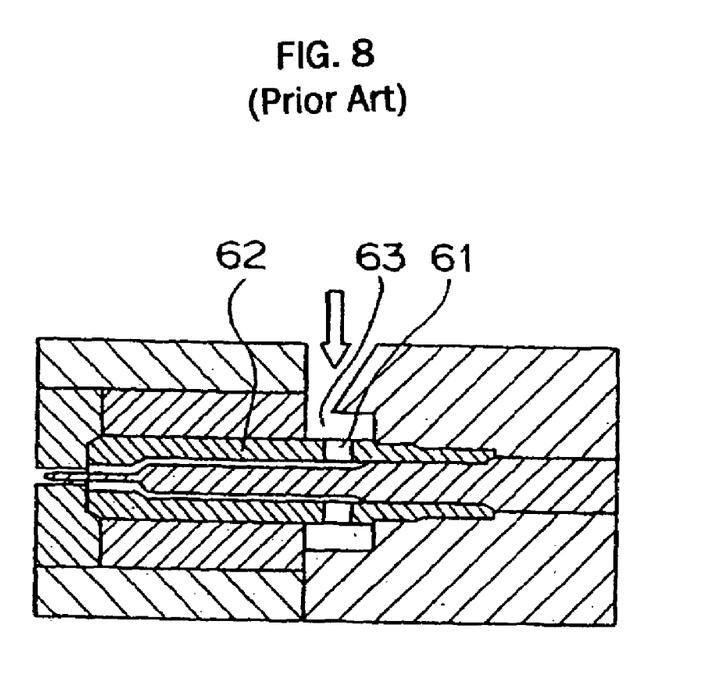
FIG. 8 is a view showing a ferule according to a known example molded of a resin.

Further, a ferule using a hard member 62 having a through-hole 61 is disclosed as shown in FIG. 8 (Japanese Patent Application Laid-open Publication No. 7-168054). In this ferule, a resin injected from an injection port is supplied into a hollow portion that forms a collar 63 and further into the inside of the hard portion 62 passing through the through-hole 61. The extraction of the hard member 62 can be prevented by molding the resin filling the through-hole 61 as described above.

Incidentally, in the structure in which the concavo-convex portion is formed to the metal pipe, complex processing is required to form the concavo-convex portion, and there is a worry that when the resin is molded, the concavo-convex portion of the pipe makes the flow of the resin bad and works against the filling of the resin. Further, an effect for preventing the rotation of the pipe cannot be obtained in the concavo-convex portion. Further, since the pipe is formed differently in front and rear portions, a step for discriminating the front portion from the rear portion to automatically execute a working process.

In contrast, in the structure in which the metal pipe has the through-hole through which the resin passes, particularly when the metal pipe has a small diameter, a fine hole is formed as the through-hole, which makes the flow of the resin bad. Further, the resins, which have passed through a plurality of holes, are mixed with each other to thereby form a welded layer of the resin in the vicinity of the extreme end of the ferule, and thus there is a possibility that the resin cannot be molded well.

Further, when the metal pipe is attached to a metal mold, the position of the through-hole must be detected first and then the through-hole must be disposed in the metal mold in a predetermined direction. A sophisticated device is required to automatically detect the position of the through-hole, from which a problem arises in that the automation of the working process is prevented by the necessity of the device. In the manufacture of the products such as the ferules which are manufactured in a large scale, the automation of a manufacturing process is a very important problem.

Further, when the ferule is inserted into and extracted from the sleeve, a force of a lengthwise direction is applied to the pipe, whereas when the ferule is engaged with the sleeve, a force may be applied to the pile in a direction in which the pipe is rotated. Accordingly, it is not preferable for the pipe itself to rotate.

An object of the present invention, which was made in view of the above problems, is to provide a ferule for an optical fiber that can fix and mold a pipe favorably as well as can be manufactured easily.

DISCLOSURE OF THE INVENTION

To solve the above technical problems, a ferule for an optical connector of the present invention for fixing and holding the ends of the optical fibers and optically coupling the optical fibers with each other by inserting ferules from both the ends of a sleeve is arranged such that a metal or non-metal pipe 4 having cut portions 8, which are filled with a resin, or protruding portions 9, which protrude into the pipe and the peripheries of which are filled with the resin, is used, the cut portions 8 or the protruding portions 9 being formed at any one of the rear and front ends of the pipe at one position or a plurality of positions, and the base section 2 of the ferule is covered with the pipe by insert molding the pipe as well as the rear end of the pipe 4 is buried in a collar portion 5 formed to the base section.

The resin fills the insides of the cut portions 8 or the peripheries of the protruding portions 9 formed at the rear end or the front end of the pipe, respectively by insert molding the pipe, thereby the pipe 4 is fixed and held and the rotation and the extraction of the pipe can be prevented.

Further, a ferule for an optical connector of the present invention for fixing and holding the ends of the optical fibers and optically coupling the optical fibers with each other by inserting ferules from both the ends of a sleeve is arranged such that a metal or non-metal pipe 4 having cut portions 8, which are filled with a resin, or protruding portions 9, which protrude into the pipe and the peripheries of which are filled with the resin, is used, the cut portions 8 or the protruding portions 9 being formed at both the rear and front ends of the pipe at one position or a plurality of positions, and the base section 2 of the ferule is covered with the pipe by insert molding the pipe as well as the rear end of the pipe 4 is buried in a collar portion 5 formed to the base section.

A ferule for an optical connector of the present invention for fixing and holding the ends of the optical fibers and optically coupling the optical fibers with each other by inserting ferules from both the ends of a sleeve is arranged such that a metal or non-metal pipe 4 having cut portions 8, which are filled with a resin., or protruding portions 9, which protrude into the pipe and the peripheries of which are filled with the resin, is used, the cut portions 8 or the protruding portions 9 being formed at any one of the rear and front ends of the pipe at one position or a plurality of positions, and the base section 2 of the ferule is covered with the pipe by insert molding the pipe as well as the rear end of the pipe 4 is buried in a collar portion 5 formed to the base section, and the extreme end of the pipe is abutted against the extreme end protruding portion 6 of the base section having an expanded diameter.

Further, a ferule for an optical connector of the present invention for fixing and holding the ends of the optical fibers and optically coupling the optical fibers with each other by inserting ferules from both the ends of a sleeve is arranged such that a metal or non-metal pipe 4 having cut portions 8, which are filled with a resin, or protruding portions 9, which protrude into the pipe and the peripheries of which are filled with the resin, is used, the cut portions 8 or the protruding portions 9 being formed at both the rear and front ends of the pipe at one position or a plurality of positions, and the base section 2 of the ferule is covered with the pipe by insert molding the pipe as well as the rear end of the pipe 4 is buried in a collar portion 5 formed to the base section, and the extreme end of the pipe is abutted against the extreme end protruding portion 6 of the base section having an expanded diameter.

In addition to the above arrangements, this invention is arranged such that the cut portions 8 are formed by cutting the inner wall surface of the pipe at an end thereof in a V-shape.

Further, in addition to the above arrangements, this invention is arranged such that the protruding portions 9 are formed by protruding an end of the pipe into the pipe in a V-shape.

Further, in addition to the above arrangements, this invention is arranged such that an optical fiber inserting portion is formed to the base section 2 rearward of the collar portion 5, and a taper-shaped inserting hole 15 whose inside diameter gradually decreases toward an extreme end is formed from the inserting portion to a front portion of the collar portion.

BRIEF DESCRIPTION OF THE DRAWINGS

FIGS. 5(a) and (b) are views explaining the ferule according to the present invention molded of a resin.

BEST MODE FOR CARRYING OUT THE INVENTION

An embodiment of a ferule for an optical connector according to the present invention will be explained below with reference to the drawings.

Figure 1:
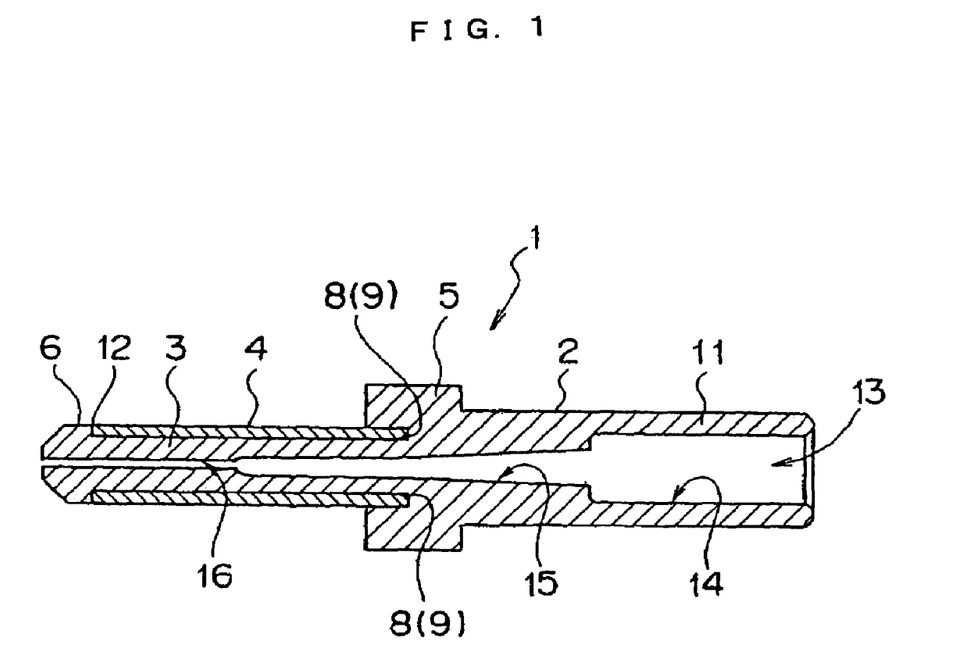
FIG. 1 is a view showing a cross-section of a ferule according to an embodiment of the present invention.

FIG. 1 shows the ferule 1 according to the present invention. The ferule 1 composed of a synthetic resin is arranged such that the engaging portion 3 of the base section 2 thereof is covered with a cylindrical metal or non-metal pipe 4 and an insertion hole 13 through which an optical fiber cable is inserted is formed through the axial center portion of the base section 2.

The ferule 1 is a resin molded product formed by insert molding the pipe 4. A liquid crystal polymer (LCP) and the like are used as a synthetic resin material of the base section 2 of the ferule 1. When the metal pipe 4 is used, stainless steel (SUS), nickel, and the like are employed as a metal material. When the non-metal pipe 4 is used, such as zirconia, ceramics, epoxy resin, and the like are employed as a material. In any of the cases, it is preferable to employ a hard material whose surface can be polished very accurately and which is suitable for insert molding as the material of the pipe 4.

The base section 2 of the ferule 1 has a color portion 5 which is formed approximately at the center thereof and has a collar portion 5 whose diameter is expanded, an extreme end protruding portion 6 is formed forward of the collar portion 5 across the engaging portion 3 and an optical fiber inserting portion 11 is formed rearward of the collar portion 5 integrally therewith, respectively. The extreme end protruding portion 6 has a diameter larger than that of the engaging portion 3 and has an annular stepped portion 12 formed between it and the engaging portion 3, and the engaging portion 3 is covered with the pipe 4 as well as the extreme end of the pipe 4 is abutted against the stepped portion 12. Extraction of the pipe 4 can be prevented by the stepped portion 12. The rear end of the pipe 4 is buried in a collar portion 5 by being inserted into the intermediate portion of the collar portion 5 in the interval from the front end to the rear end thereof, thereby the rear portion of the pipe 4 is held and fixed.

Further, the insertion hole 13 formed through the axial center portion of the base section 2 has a first insertion hole 14 having a large inside diameter, a second insertion hole 15 having an inside diameter gradually decreasing toward an extreme end, and a third insertion hole 16 having a small inside diameter. The first and second insertion holes 14 and 15 are portions into which the optical fiber is inserted in a shielded state, and the third insertion hole 16 is a portion into which the strands of the optical fiber, from which a shielding portion has been removed, are inserted.

Figure 2:
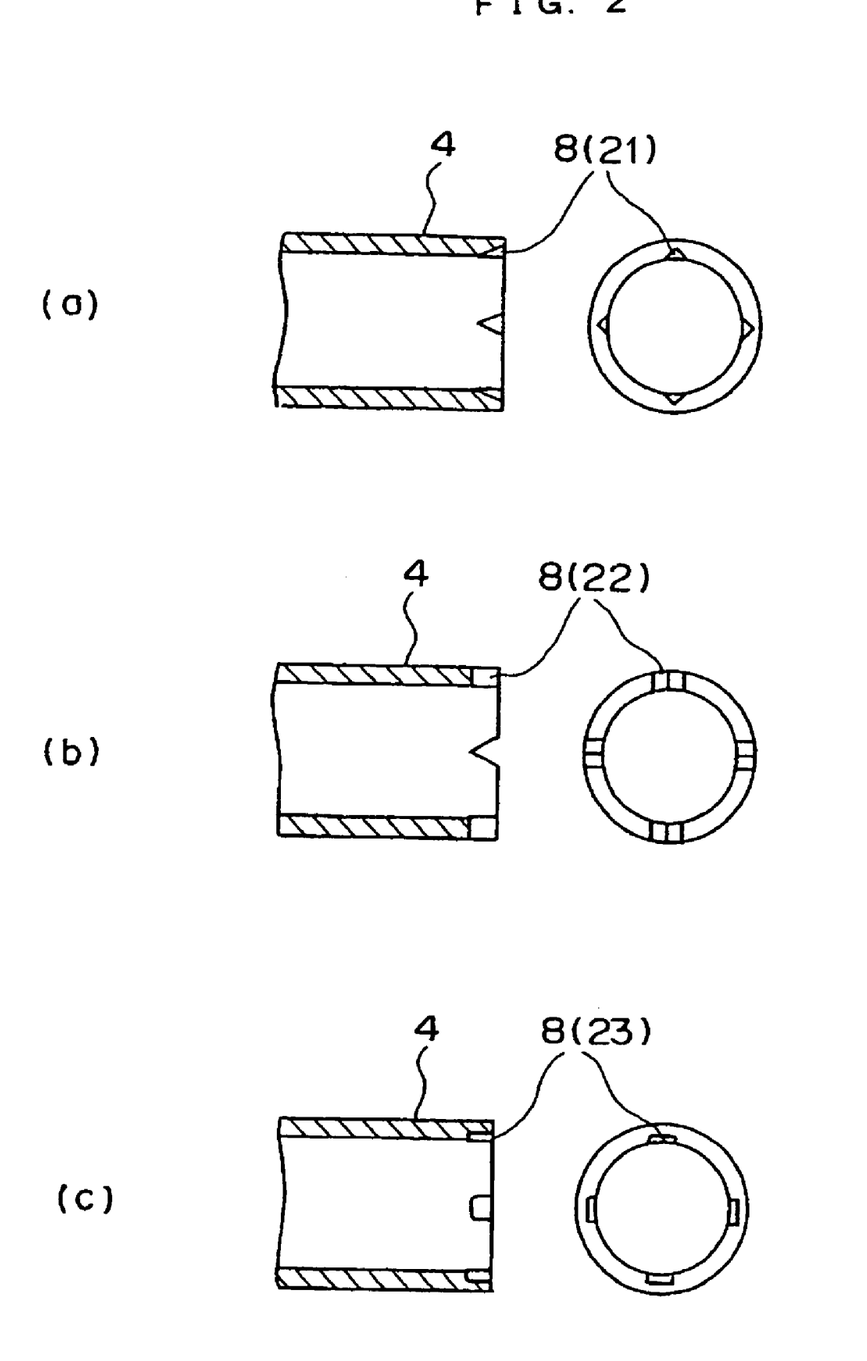
FIGS. 2(a), 2(b) and 2(c) are views showing various types of pipes according to the present invention with which the ferule is covered.

The pipe 4 has cut portions 8 or protruding portions 9, which protrude into the pipe, these portions 8 or 9 being disposed at an end of the pipe. FIGS. 2(a), 2(b) and 2(c) show various structures of the cut portions 8, and any of the cut portions 8 are formed at four positions around the end of the pipe 4 at equal intervals. FIG. 2(a) shows a structure 21 in which the inner wall surface of the pipe 4 is cut in a V-shape, FIG. 2(b) shows a structure 22 in which the end of the pipe 4 is cut toward the other end thereof in a V-shape, and FIG. 2(c) shows a structure 23 in which the inner wall surface of the pipe 4 is cut in a U-shape, respectively. In any of the structures, it is enough that the cut portions be formed such that the sectional surface of the pipe 4 is varied in a longitudinal direction.

Figure 4:
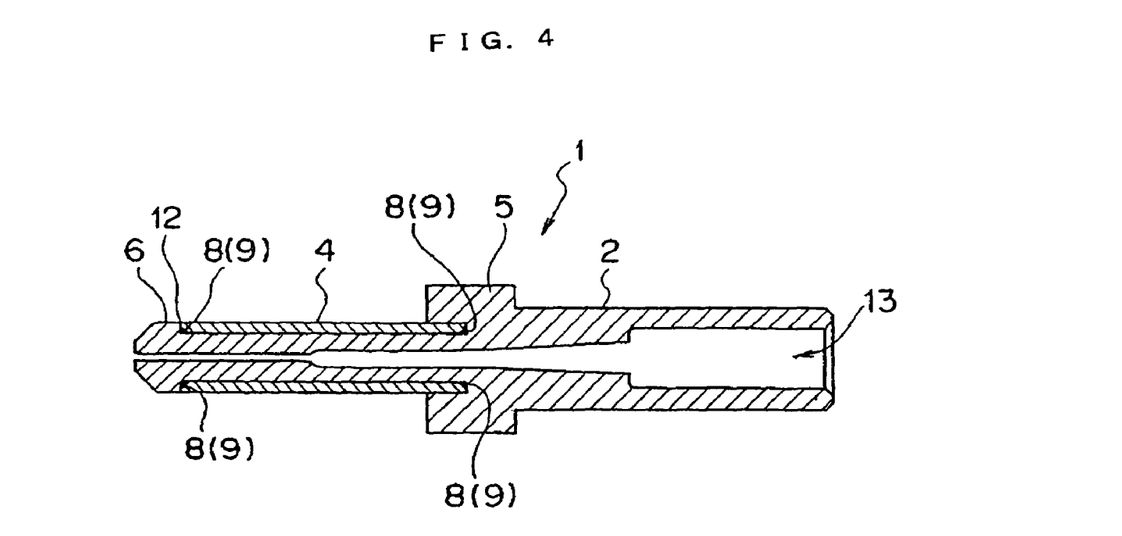
FIG. 4 is a view showing a cross section of other ferule according to the embodiment of the present invention.

There are a mode in which the cut portions 8 are formed at only the rear end of the pipe 4 as shown in FIG. 1, a mode in which they are formed at only a front end of the pipe 4, and mode in which they are ford at both the rear and front ends as shown in FIG. 4. In any of the modes, a resin is filled in the cut portions 8 so that the pipe 4 is fixed to and held by the base section 2 of the ferule and prevented from being rotated and extracted.

In the ferule 1 according to the embodiment, the cut portions 8 may be formed at any of the extreme end and the rear end of the pipe 4. Accordingly, there can be omitted a troublesome job for discriminating the front and rear directions of the pipes 4 one by one (discriminating the end of the pipe 4 at which the cut portions 8 are formed) in a manufacturing. Further, in the mode in which the cut portions 8 are formed at both the front and rear ends of the pipe 4, no problem arises as to the direction of the pipe 4, and thus a manufacturing process for discriminating the direction of the pipe 4 is not necessary. Although the effect of fixing and holding the pipe 4 can be obtained by not less than one cut portion 8, three to eight cut portions 8 formed at one end are preferable from the view point strength.

Figure 3:
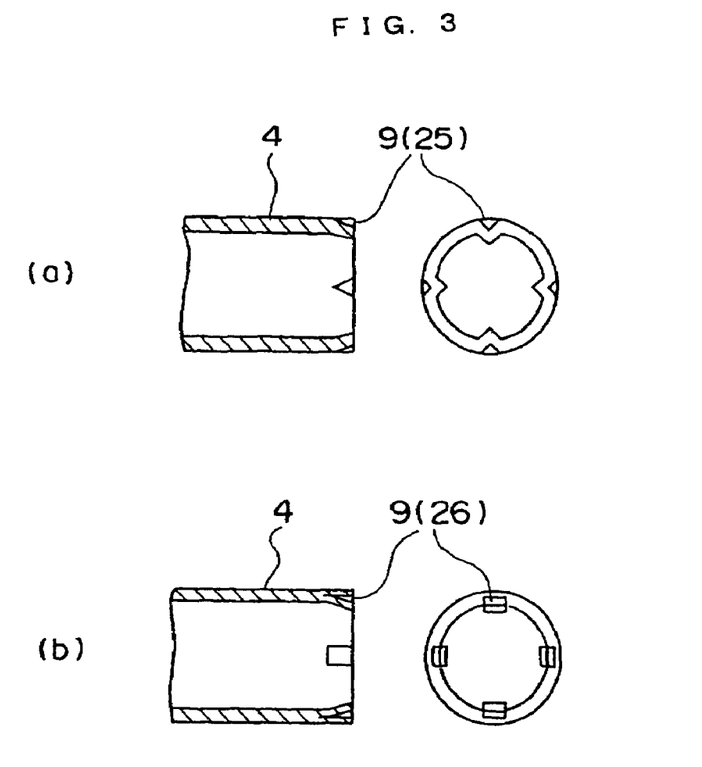
FIG. 3 is a view showing pipes (a) and (b) according to the present invention with which the ferule is covered.

FIGS. 3(a) and 3(b) show various structures of the protruding portions 9. The protruding portions 9 having any of the structures are formed at four portions around an end of the pipe 4 at equal intervals. FIG. 3(a) shows a structure 25 in which V-shaped protrusions protruding into the pipe are formed at an end of the pipe 4, and FIG. 3(b) shows a structure 26 in which the half of the wall thickness of the pipe sheet is bent toward the inside of the pipe in a tongue shape, respectively. In any of the structures, it is enough for the protruding portions to have a structure which causes the cross section of the pipe 4 to be varied in a lengthwise direction.

Further, there are a mode in which the protruding portions 9 are formed at only the rear end of the pipe 4, a mode in which they are formed at only the front end of the pipe 4, and a mode in which they are formed at both the rear and front portions of the pipe 4. In any of the modes, a resin is filled around protruding portions 9 so that the pipe 4 is fixed to and held by the base section 2 of the ferule and prevented from being rotated and extracted.

Further, since the protruding portions 9 may be formed at any of the rear and front ends of the pipe 4, there can be omitted a troublesome job for discriminating the front and rear directions of the pipes 4 one by one in a manufacturing. In the mode in which the protruding portions 9 are formed at both the front and rear ends of the pipe, no problem arises as to the direction of the pipe 4. About three to eight protruding portions 9 formed at one end are preferable from the view point strength like wise the above cut portions 8.

In the molding of the pipe 4, when it is formed of the metal, a pipe is cut to a predetermined length, and the cut portions 8 or the protruding portions 9 are formed by press working and the like. Further, the pipe 4, which is formed of a non-metal material, for example, zirconia, is obtained in such a manner that zirconia powder is injection molded so as to form the pipe having the cut portions 8 or the protruding portions 9 at an end thereof, and the pipe is baked.

After the above working, the surface of the pipe 4 is polished, thereby the circularity of the outside diameter of the pipe 4 is improved. The surface of the pipe is polished by a so-called centerless polishing method. In the centerless polishing, since a work is placed between two abrasive wheels and the outer periphery of the work is polished with a pinpoint accuracy, a large number of cylindrical members can be polished.

After the pipe 4 has been polished, it is transported to a resin molding process. At this time, when the pipe 4 has a resin injection hole as in the pipe of the example shown in the background art, or when the forward and rearward directions of the pipe 4 must be discriminated, the dynamic construct a mass-production process is prevented because the direction of the resin injection hole and the forward and rearward directions of the pipe 4 must be discriminated. However, in the pipe 4 according to the above embodiment, such discrimination processes can be omitted.

Figure 5:
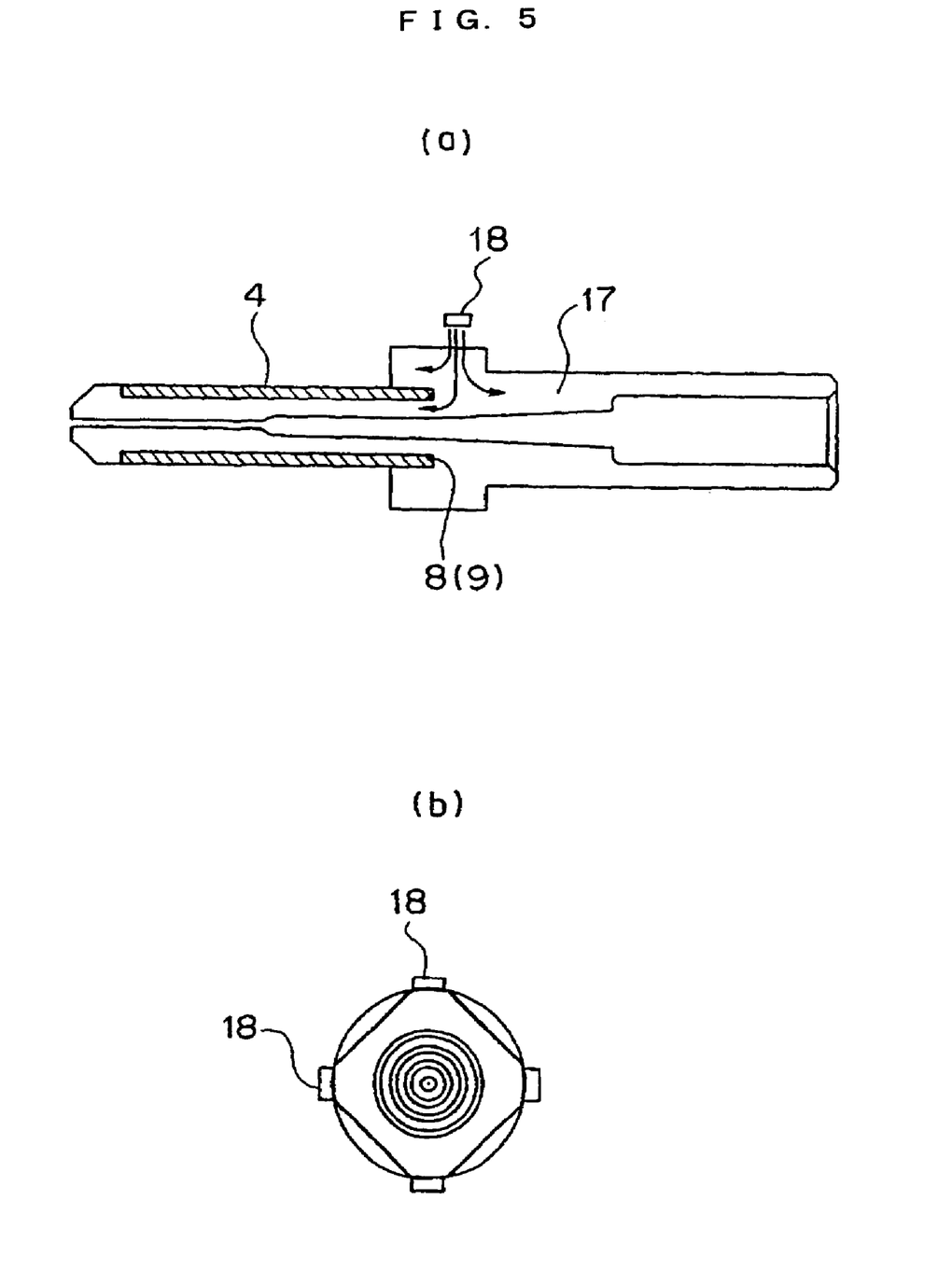

In the resin molding process, the pipe 4 transported thereto is gripped with a robot arm, and the like and automatically supplied to a resin molding metal mold. In the injection molding executed using the metal mold, a molten resin injected from gates 18 moves in the rear direction of the ferule passing through the collar portion acting as a cavity 17 and moves in the extreme end direction of the ferule passing through the pipe 4 and is filled in the cavity 17 as shown in FIGS. 5(a) and 5(b). When the molten resin passes through the pipe 4, the cut portions 8 and the like of the pipe 4 do not prevent the resin passing therethrough, and thus the flow path of the molding resin is formed smoothly in its entirety. The ferule is completed by molding the resin as described above.

Thus, according to the embodiment, the joint accuracy and the strength of the ferule can be improved by the attachment structure of the pipe 4 as well as the pipe 4 is strongly fixed to the base section 2, thereby the rotation and the extraction of the pipe 4 can be prevented. Further, the process for discriminating the front and rear portions, and the like of the pipe can be omitted in the manufacturing process of the ferule as well as the pipe can be automatically supplied promptly, which contributes to the manufacture of the ferule on a large scale. Further, when the pipe 4 is insert molded, since the flow path of the molding resin is smoothly formed, the molding resin can smoothly flow, which enables the resin to be molded favorably. As described above, the ferule is excellent in quality, mass-productivity, and an economical efficiency.

As described above, according to the arrangement employed by ferule of the present invention, the ferule is covered with the pipe, which has the cut portions or the protruding portions formed at one of the rear and front ends thereof, by insert molding the pipe, and the rear end of the pipe is buried in the collar portion formed to the base section. Thus, there can be achieved such effects that the rotation and the like of the pipe can be prevented because the pipe is strongly fixed to the base section, that the ferule contributes to mass production in the production process thereof because it is not necessary to discriminate the front and rear portions and the like of the pipe, and that the resin can be molded favorably because the flow path of the molding resin is formed smoothly and the ferule is excellent in the economic efficiency.

According to the arrangement employed by ferule of the present invention, the ferule is covered with the pipe, which has the cut portions or the protruding portions formed at both the rear and front ends thereof, by insert molding the pipe, and the rear end of the pipe is buried in the collar portion formed to the base section. Thus, there can be achieved such effects that the rotation and the like of the pipe can be prevented because the pipe is strongly fixed to the base section, that the ferule contributes to mass production in the production process thereof because it is not necessary to discriminate the front and rear portions and the like of the pipe, and that the resin can be molded favorably and the ferule is excellent in the economic efficiency.

Further, according to the arrangement employed by the ferule of the present invention, the ferule is covered with the pipe, which has the cut portions or the protruding portions formed at one of the rear and front ends thereof, by insert molding the pipe, the rear end of the pipe is buried in the collar portion, and the extreme end of the pipe is abutted against the extreme end protruding portion. Thus, there can be achieved such effects that the rotation and the like of the pipe can be prevented because the pipe is strongly fixed to the base section, that the ferule contributes to mass production in the production process thereof because it is not necessary to discriminate the front and rear portions and the like of the pipe, and that the resin can be molded favorably because the flow path of the molding resin is formed smoothly and the ferule is excellent in the economic efficiency.

Further, according to the arrangement employed by ferule of the present invention, the ferule is covered with the pipe, which has the cut portions or the protruding portions protruding into the pipe that are formed at both the rear and front ends thereof at one position or a plurality of positions, by insert molding the pipe, and the extreme end of the pipe is abutted against the extreme end protruding portion. Thus, there can be achieved effects that the rotation and the like of the pipe can be prevented because the pipe can be more strongly fixed, that the ferule contributes to mass production in the production process thereof because it is not necessary to discriminate the front and rear portions and the like of the pipe, and that the resin can be molded favorably and the ferule is excellent in the economic efficiency.

Further, according to the arrangement employed by ferule of the present invention, since the taper-shaped insertion hole, which has an inside diameter gradually decreasing toward the extreme end, of the optical fiber is formed from the inserting port of the optical fiber to the front portion of the collar portion. Thus, there can be achieved an effect that the collar portion is excellent in strength because its wall thickness can be secured as well as an inserted optical fiber and the shield portion of the optical fiber can be securely fixed to the taper-shaped insertion hole, and the optical fiber can be stably held.

What is claimed is:

1. A ferule for an optical connector for fixing and holding the ends of optical fibers and optically coupling the optical fibers with each other by inserting ferules from both the ends of a sleeve, characterized in that:

a metal or non-metal pipe having cut portions, which are filled with a resin, or protruding portions, which protrude into the pipe and the peripheries of which are filled with the resin, is used, the cut portions or the protruding portions being formed at the front end of the pipe at one position or a plurality of positions; and the base section of the ferule is covered with the pipe by insert molding the pipe as well as the rear end of the pipe is buried in a collar portion formed to the base section, and the extreme end of the pipe is abutted against the extreme end protruding portion of the base section having an expanded diameter.

2. A ferule for an optical connector for fixing and holding the ends of optical fibers and optically coupling the optical fibers with each other by inserting ferules from both the ends of a sleeve, characterized in that:

a metal or non-metal pipe having cut portions, which are filled with a resin, or protruding portions, which protrude into the pipe and the peripheries of which are filled with the resin, is used, the cut portions or the protruding portions being formed at both the rear and front ends of the pipe at one position or a plurality of positions; and the base section of the ferule is covered with the pipe by insert molding the pipe as well as the rear end of the pipe is buried in a collar portion formed to the base section, and the extreme end of the pipe is abutted against the extreme end protruding portion of the base section having an expanded diameter.

3. A ferule of an optical connector according to claim 1, characterized in that the cut portions are formed by cutting the inner wall surface of the pipe at an end thereof in a V-shape.

4. A ferule of an optical connector according to claim 2, characterized in that the cut portions are formed by cutting the inner wall surface of the pipe at an end thereof in a V-shape.

5. A ferule of an optical connector according to claim 1, characterized in that the protruding portions are formed by protruding an end of the pipe into the pipe in a V-shape.

6. A ferule of an optical connector according to claim 2, characterized in that the protruding portions are formed by protruding an end of the pipe into the pipe in a V-shape.

7. A ferule of an optical connector according to claim 3, characterized in that an optical fiber inserting portion is formed to the base section rearward of the collar portion, and a taper-shaped inserting hole whose inside diameter gradually decreases toward an extreme end is formed from the inserting portion to a front portion of the collar portion.

8. A ferule of an optical connector according to claim 4, characterized in that an optical fiber inserting portion is formed to the base section rearward of the collar portion, and a taper-shaped inserting hole whose inside diameter gradually decreases toward an extreme end is formed from the inserting portion to a front portion of the collar portion.

* * * * *